(12) United States Patent
Yu et al.

(10) Patent No.: US 7,556,766 B2
(45) Date of Patent: Jul. 7, 2009

(54) CONTROLLED FREE VORTEX SCRAP INGESTER AND MOLTEN METAL PUMP

(75) Inventors: Ho Yu, Murrysville, PA (US); Donald L. Stewart, Jeannette, PA (US)

(73) Assignee: Alcoa Inc., Pittsburgh, PA (US)

( * ) Notice: Subject to any disclaimer, the term of this patent is extended or adjusted under 35 U.S.C. 154(b) by 246 days.

(21) Appl. No.: 11/559,939

(22) Filed: Nov. 15, 2006

(65) Prior Publication Data
US 2007/0108674 A1    May 17, 2007

Related U.S. Application Data

(60) Provisional application No. 60/737,155, filed on Nov. 15, 2005.

(51) Int. Cl.
C22B 9/16 (2006.01)
(52) U.S. Cl. .................. 266/235; 266/900; 266/901; 75/687
(58) Field of Classification Search .............. 266/235, 266/900, 901
See application file for complete search history.

(56) References Cited

U.S. PATENT DOCUMENTS

| | | | |
|---|---|---|---|
| 3,295,608 A | * | 1/1967 | Arshal ................. 416/189 |
| 4,286,985 A | | 9/1981 | van Linden et al. |
| 4,598,899 A | | 7/1986 | Cooper |
| 4,802,656 A | | 2/1989 | Hudault et al. |
| 4,930,986 A | | 6/1990 | Cooper |
| 5,165,858 A | | 11/1992 | Gilbert et al. |
| 5,308,045 A | | 5/1994 | Cooper |
| 6,019,576 A | | 2/2000 | Thut |
| 6,074,455 A | | 6/2000 | van Linden et al. |
| 6,723,276 B1 | | 4/2004 | Cooper |

FOREIGN PATENT DOCUMENTS

JP          71031655 B    * 10/1967

* cited by examiner

*Primary Examiner*—Melvin Curtis Mayes
*Assistant Examiner*—James Corno
(74) *Attorney, Agent, or Firm*—Greenberg Traurig LLP

(57) ABSTRACT

A scrap melter for light gage metal scrap includes a shrouded impeller connected to a shaft, the shaft connected to a rotary power device. The shrouded impeller is immersed in a molten metal pool in a charge bay or furnace. It is inclined at an angle relative to the vertical. The shrouded impeller creates a vortex in the molten metal pool, which includes a whirlpool at the surface of the molten metal. The center of the whirlpool is horizontally displaced from the shaft so that scrap can be charged into the whirlpool to be ingested into the vortex. The shrouded impeller creates a vortex for scrap ingestion and pumps molten metal for re-circulation through the melting system without the need of a separate pump.

17 Claims, 11 Drawing Sheets

OPEN CHARGE BAY CONTINUOUS MELTER SCHEMATIC
SECTION A-A

OPEN CHARGE BAY CONTINUOUS MELTER SCHEMATIC
SECTION A-A

SECTION 10-10

SECTION 11-11

CONTROLLED FREE VORTEX SCRAP INGESTER AND MOLTEN METAL PUMP

CROSS REFERENCE TO RELATED APPLICATIONS

This application is based on and claims the benefit of U.S. provisional application Ser. No. 60/737,155 filed Nov. 15, 2005, which is incorporated herein by reference for any and all purposes.

BACKGROUND OF THE INVENTION

Scrap melters have been developed that are particularly intended for remelting light gauge scrap such as metal chips from a machine shop, or for used beverage cans. Such scrap has the property of being difficult to incorporate into a molten metal pool. Air may be trapped in the scrap, or an oxide layer on the scrap, contacting an oxide layer on the molten metal pool, may prevent the metal in the scrap from contacting the metal in the pool. It is particularly true of aluminum that the oxide layer is very strong and hard to break. If one heats light gauge aluminum scrap above the melting point of aluminum, one is likely to obtain piles of aluminum oxide containing molten aluminum, rather than a pool of molten aluminum.

Various prior art systems have employed vigorous movement of liquid metal, which serves to break oxide films and incorporate light gauge scrap into a pool or stream of liquid metal.

U.S. Pat. No. 6,074,455 entitled "Aluminum Scrap Melting Process and Apparatus" teaches an apparatus that includes a furnace which supplies hot molten metal to a first melting bay through an opening in the bottom of the first melting bay. An impeller driven by a vertical shaft draws liquid metal upwardly, into the first melting bay, and imparts a rotary motion to the liquid metal to produce a vortex of molten metal. Scrap metal is supplied to the vortex, which ingests the scrap metal. The wall of the first melting bay has a spiral form defining an exit channel which leads to an adjacent melting bay. The rotary motion of the liquid metal causes it to flow out of the exit channel and into the adjacent melting bay, where skim is removed. Molten salt in that bay may facilitate the separation of aluminum from the skim. Alternatively, salt may be added in a fluxing bay disposed at the output of the exit channel, between the first melting bay and the second melting bay. Molten salt tends to separate the molten aluminum from the oxide layer on the aluminum.

U.S. Pat. No. 5,930,986 "Apparatus for Immersing Solids Into Fluids and Moving Fluids in a Linear Direction" teaches an impeller assembly including an impeller which is surrounded by a hollow cylindrical portion that is attached to the impeller blades. The cylindrical portion may extend axially in either direction, upstream or downstream of the impeller blades. The impeller is shown mounted with a vertical shaft, and floating solids being drawn downward into the impeller, on the surface of a vortex created by the impeller.

U.S. Pat. No. 6,723,276 "Scrap Melter and Impeller" teaches an impeller without a cylindrical sleeve. The impeller is shown mounted on a vertical shaft. Blades of the impeller may or may not have pitch. In either case, a vortex is created, which serves to submerge scrap metal floating on the surface of the vortex.

U.S. Pat. No. 4,286,985 "Vortex Melting System" teaches an improved method and apparatus for ingesting and melting metal scrap that otherwise tends to float on the surface of a molten melting medium. A supply of molten metal is divided into two streams which flow into a receptacle. The receptacle has a submerged outlet. One of the streams enters the receptacle tangentially to produce a vortex. The other stream enters radially and it breaks up the symmetry of the vortex in a manner which enhances ingestion of floating scrap into the vortex.

FIGS. 1, 2 and 3 are schematic illustrations of a typical prior art system for melting scrap such as used aluminum beverage cans. Liquid metal is heated in a furnace and flows to a circulating pump, as seen in FIG. 1. It then flows into a receptacle resembling a toilet bowl where it forms a vortex. Scrap is supplied to the vortex, where it is ingested into the metal stream. It flows out of a submerged outlet into a skim bay, where oxides and other nonmetallic solids are skimmed off. It then flows back to the furnace.

FIG. 2 is an illustration of the prior art system illustrated in FIG. 1; FIG. 2 further defining section 3-3.

FIG. 3 refers to the prior art system illustrated in FIGS. 1 and 2. FIG. 3 is a vertical section cut along line 3-3 in FIG. 2. From the furnace on the left, the liquid metal flows to the pump bay where it is pumped into the charge bay, which was referred to as a "toilet bowl" in FIG. 1. The molten metal, with the melted scrap, flows downward to a submerged outlet and thence to the skim bay and thence back to the furnace.

There is a need in the art for a scrap metal melter that has fewer chambers and moving parts. There is also a need in the art for a scrap metal melter that minimizes oxidation of the metal and, hence, results in increased recycling efficiency.

SUMMARY OF THE INVENTION

In one aspect, the present invention is a scrap melter for light gauge metal scrap. The scrap melter includes a shrouded impeller connected to a shaft, the shaft connected to a rotary power device. The shrouded impeller is immersed in a molten metal pool in charge bay and the shaft in inclined at an angle relative to vertical, so that the shrouded impeller produces a vortex in the molten metal pool in the charge bay. The vortex produces a whirlpool at the surface of the molten metal pool in the charge bay. The center of the whirlpool is horizontally displaced from the shaft, thus allowing free charging of the scrap whereby the scrap is ingested into the vortex.

In another aspect, the present invention is a scrap melter for light gauge metal scrap. The scrap melter includes a shrouded impeller connected to a shaft, the shaft connected to a rotary power device. The shrouded impeller is immersed in a molten metal pool in a furnace and the shaft is inclined at an angle relative to vertical so that the shrouded impeller produces a vortex in the molten metal pool in the furnace, the vortex producing a whirlpool at the surface of the molten metal pool in the furnace. The center of the whirlpool is horizontally displaced from the shaft; thus allowing free charging of the scrap whereby the scrap is ingested into the vortex.

BRIEF DESCRIPTION OF THE DRAWINGS

These and other features, aspects, and advantages of the present invention will become better understood with regard to the following description, appended claims, and accompanying drawings where:

DESCRIPTION

Figure 1:
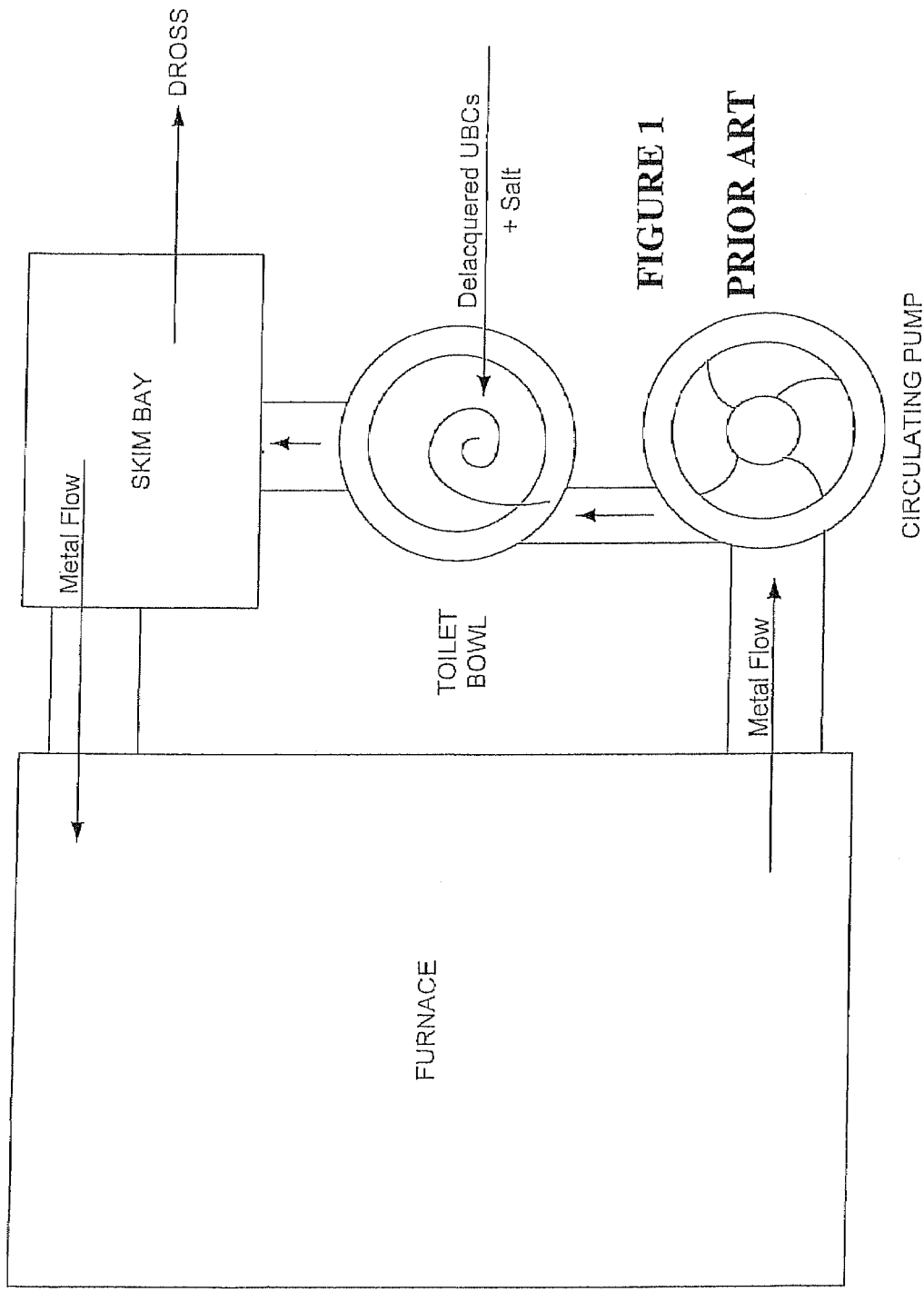
FIG. 1 is a schematic plan view of a conventional prior art continuous melter.
Figure 2:
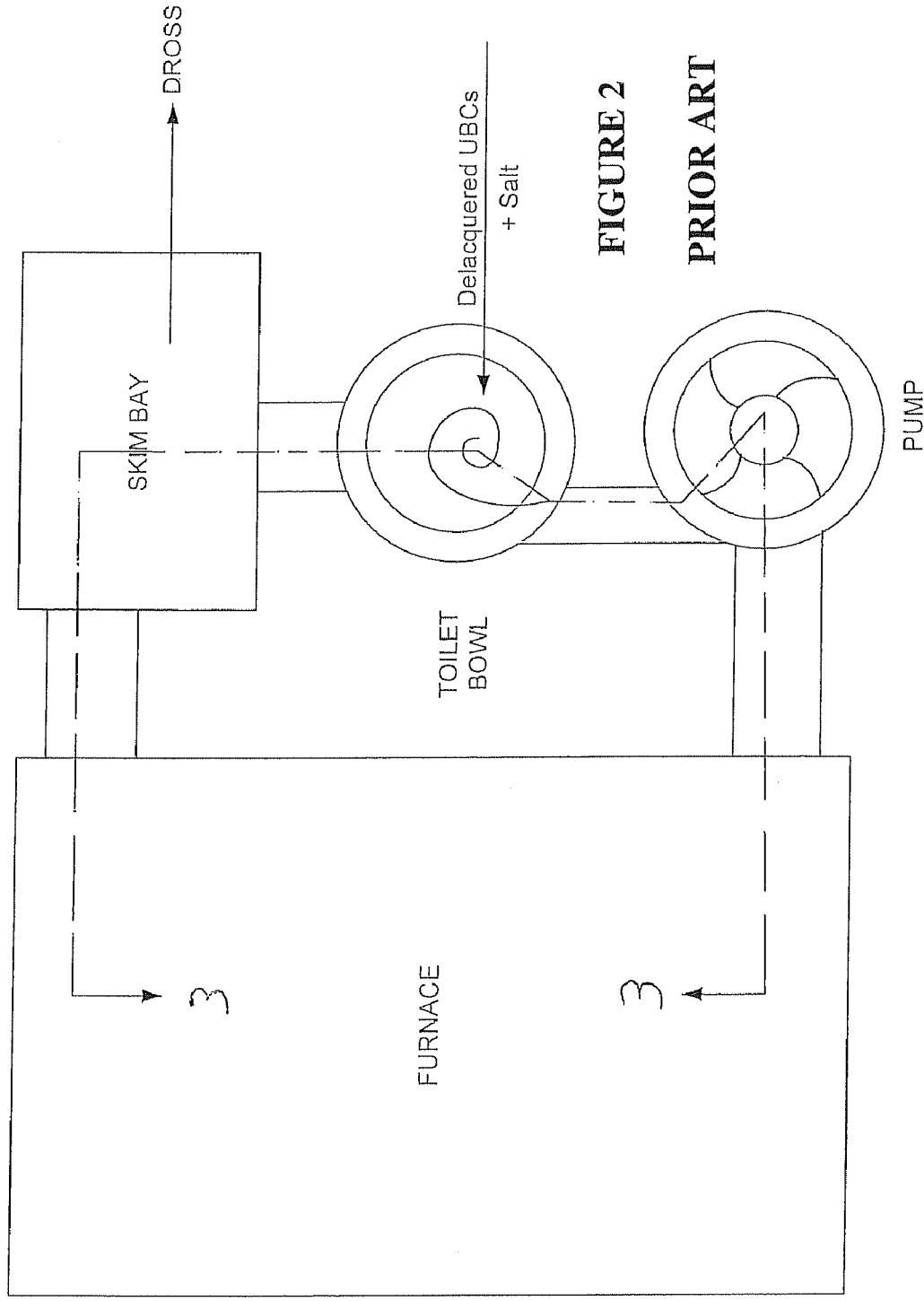
FIG. 2 is the schematic plan view of the conventional prior art continuous melter of FIG. 1, but further defining vertical section 3-3.
Figure 3:
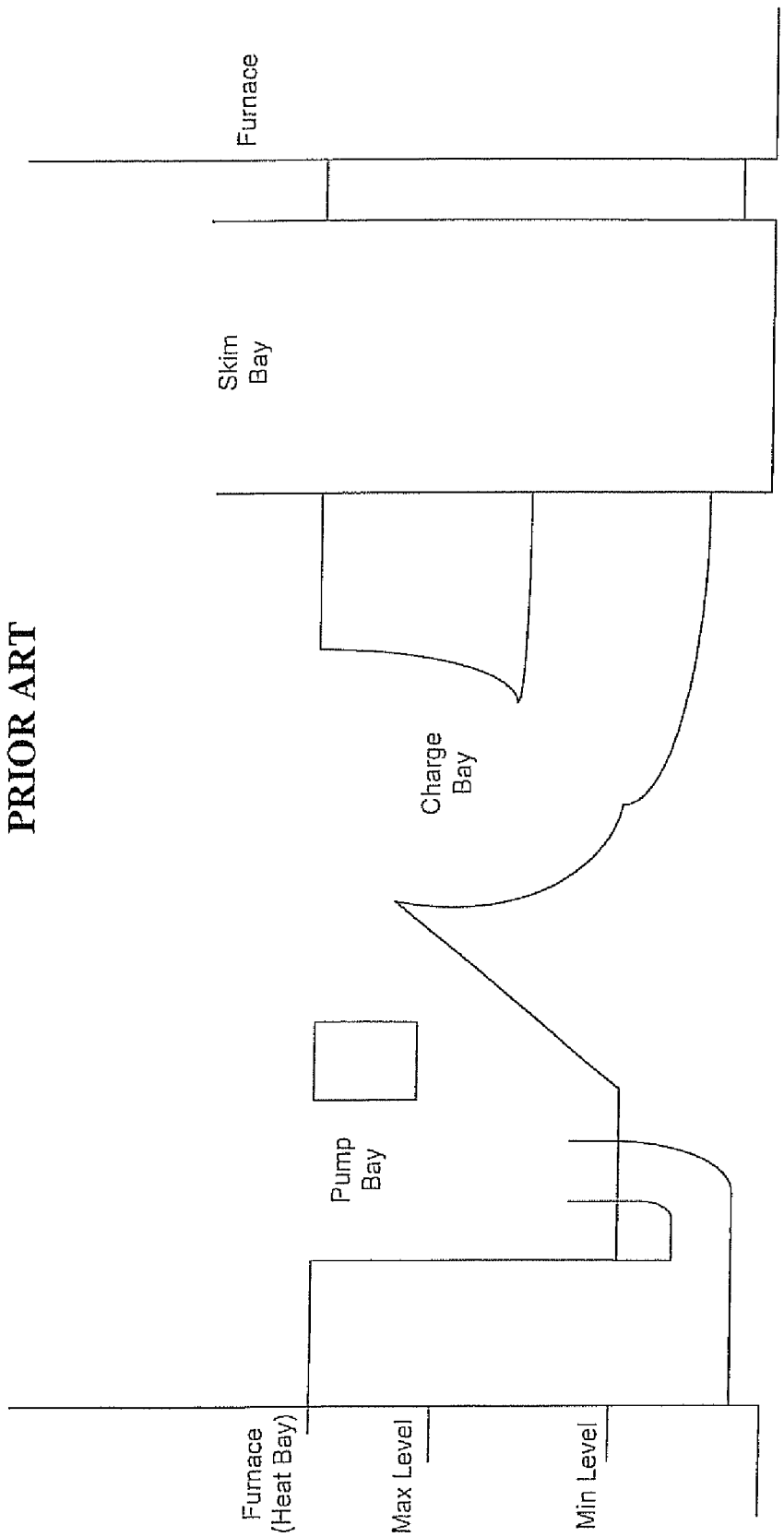
FIG. 3 is section 3-3, defined in FIG. 2, of the conventional prior art continuous melter shown in FIGS. 1 and 2.
Figure 4:
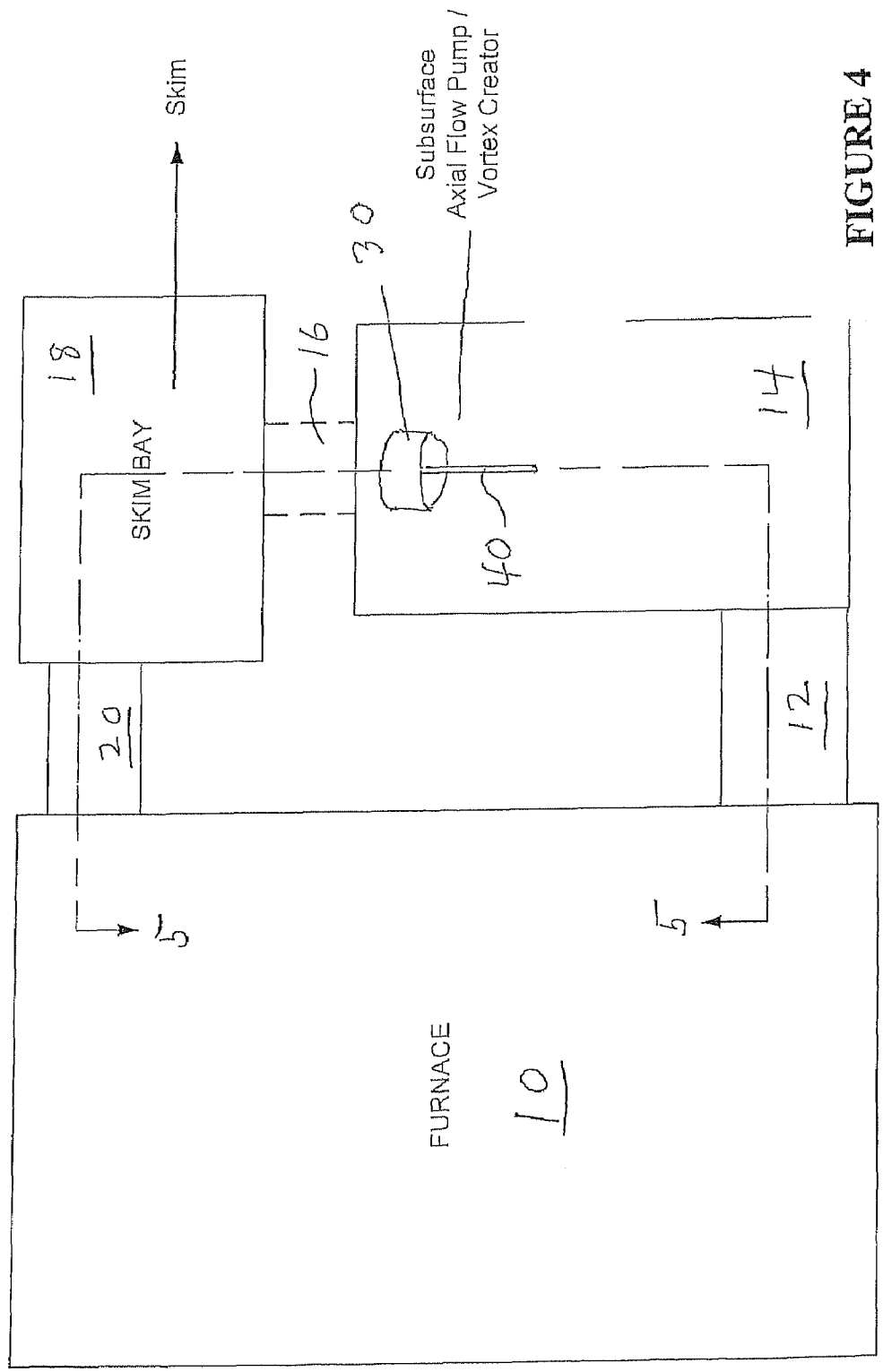
FIG. 4 is a schematic plan view of an open charge bay continuous melter according to one embodiment of the present invention, and it defines vertical section 5-5.
Figure 5:
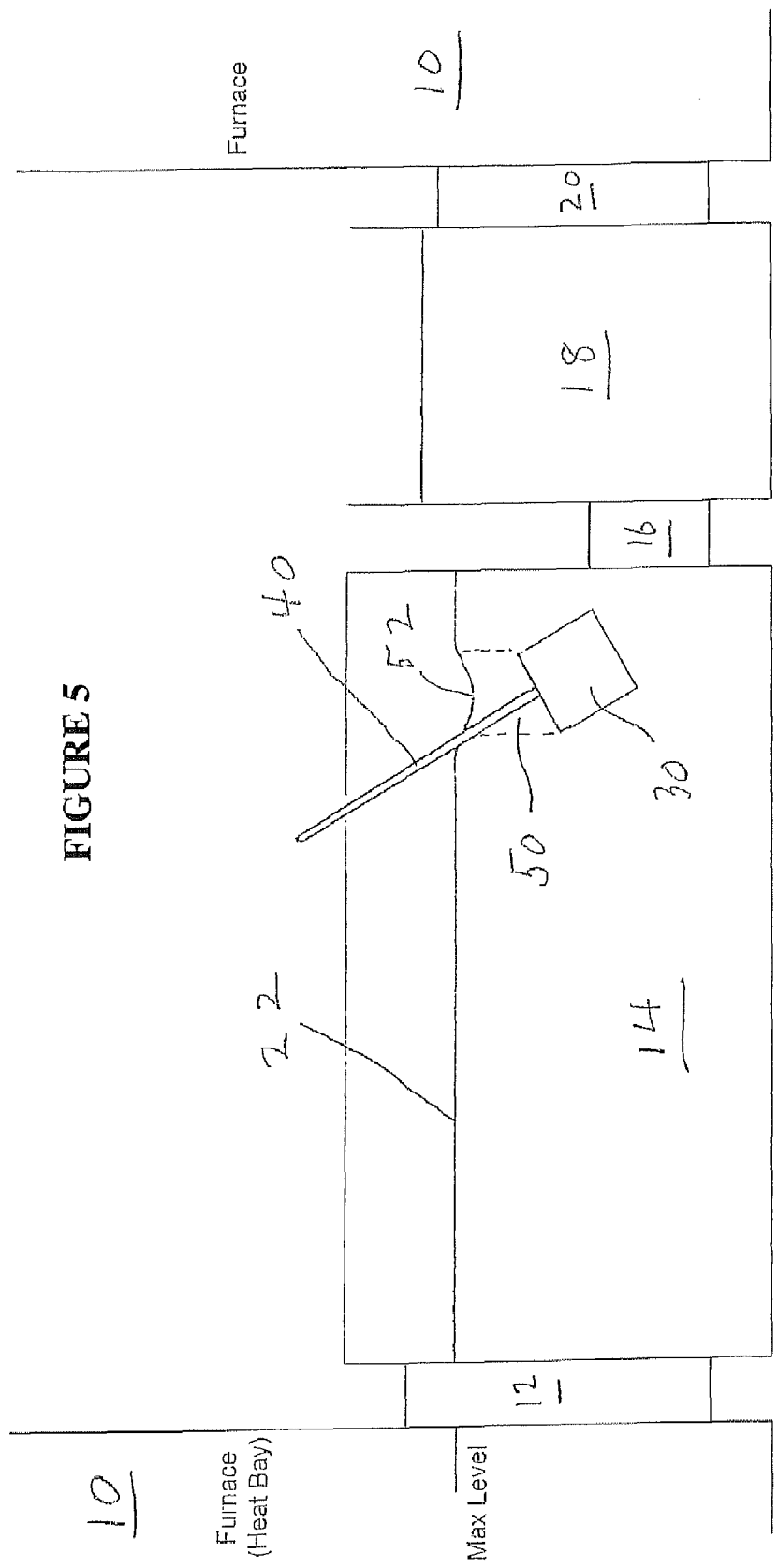
FIG. 5 is vertical section 5-5, defined in FIG. 4, of an open charge bay continuous melter according to the embodiment of FIG. 4.

FIGS. 4 and 5 depict an open charge bay continuous melter in accordance with the present invention. FIG. 4 is a top view and it defines a section 5-5. FIG. 5 is a vertical section along section 5-5.

The system shown in FIGS. 4 and 5 includes a molten metal loop. Heat is supplied to molten metal in furnace 10. It then flows through passage 12 to the open charge bay 14.

A shrouded impeller 30 is immersed in molten metal in the open charge bay 14. The shrouded impeller 30 is inclined as illustrated in FIG. 5, and it is mounted on shaft 40 to be rotated thereby.

The shrouded impeller 30 exerts an axial thrust on the liquid metal. This causes the molten metal to circulate by flowing through passage 16 to skim bay 18 and then through passage 20 and back to furnace 10. The entire circuit, from furnace 10 to open charge bay 14, skim bay 18 and back to furnace 10 is driven by the shrouded impeller 30. No other pump is required.

An additional function of the shrouded impeller 30 is to generate a vortex 50 in charge bay 14. The vortex 50 produces a whirlpool 52 at the surface 22 of molten metal in charge bay 14. The whirlpool 52 is horizontally displaced from the shaft 40 so that the shaft is not in the center of the vortex 50. Tests of this apparatus have shown that the vortex 50 generated by shrouded impeller 30 has a diameter about equal to the diameter of shrouded impeller 30. The surface 22 of the molten metal in the open charge bay 14 preferably is generally quiescent, i.e. has no turbulent waves. Only the whirlpool 52 has turbulent flow, Which is caused by vortex 40.

Preferably, light gage metal scrap is brought by a conveyor belt (not shown) to a chute (not shown), which directs the scrap into whirlpool 52, where it is ingested into the molten metal. The inclination of shrouded impeller 30 and shaft 40 serves to keep shaft 40 away from the scrap being introduced. (The inclination of impeller 30 also serves to cause flow of molten metal around the circuit.) The angle of the impellers 30 and the shaft 40 can be any angle from vertical as long as the shaft is not in the center of the whirlpool 52 and the impeller causes molten metal to flow around the circuit in the desired direction at a desired rate. Heavy scrap, which does not tend to float, may be charged into charge bay 14 in the open space to the left of shrouded impeller 30.

The form of the vortex 50 and whirlpool 52 do not depend significantly on the size or shape of the charge bay 40, because vortex 50 and whirlpool 52 exist, primarily, only in the liquid metal above the shrouded impeller 30. Thus, the shrouded impeller 30, inclined as shown in FIG. 5, can be used in charge bays having many different forms.

This highlights another desirable feature of the system illustrated in FIG. 5. Most of the molten metal surface 22 is quiescent, so all oxide layer on it prevents further oxidation of the molten metal. (This is particularly true of molten aluminum.)

Figure 6:
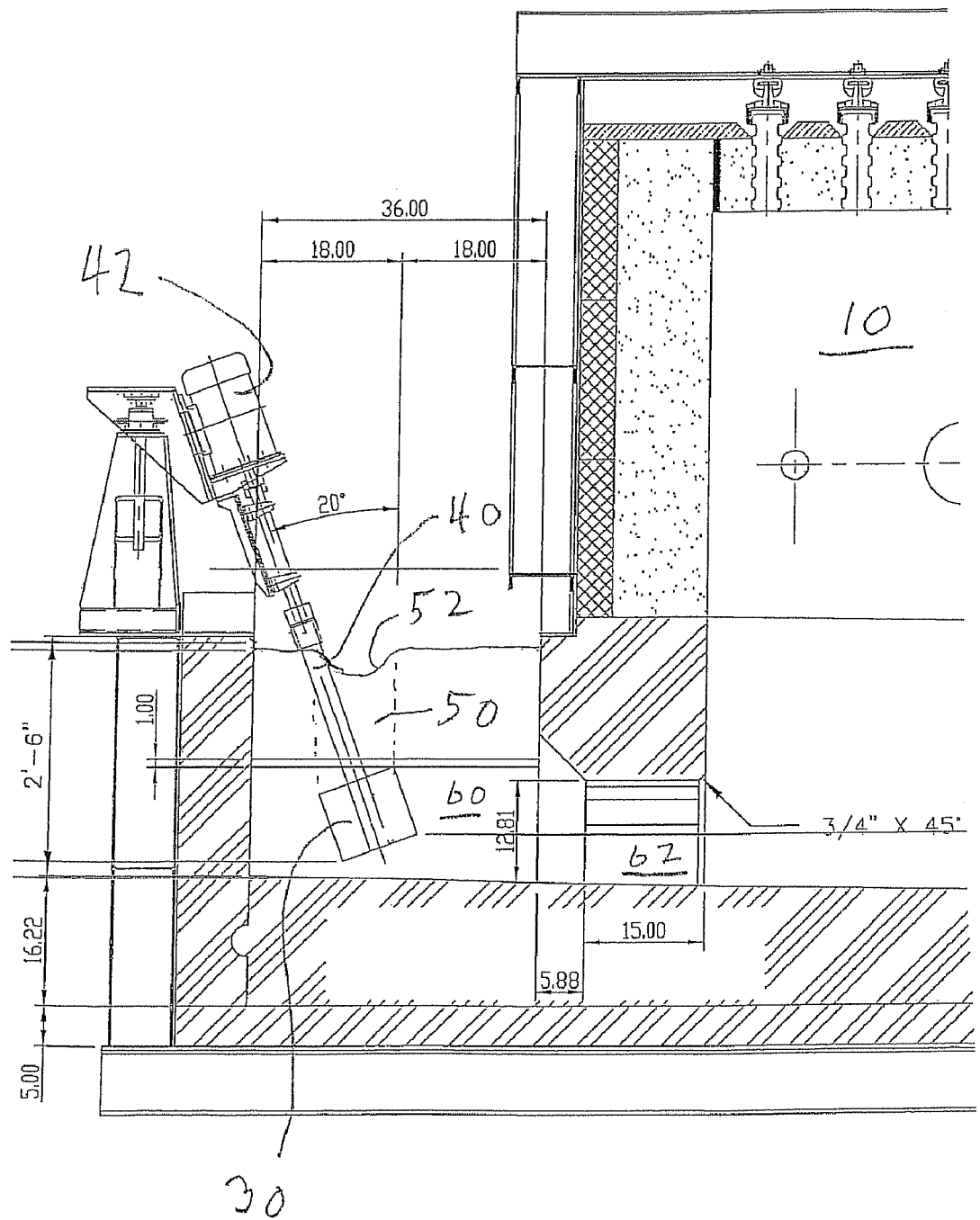
FIG. 6 is a schematic vertical section of another embodiment of an open bay continuous melter, according to the present invention.

FIG. 6 illustrates all alternative configuration, in which liquid metal flows from a charge bay 60 directly to furnace 10 through passage 62. As with the configuration shown in FIG. 5, the inclination of shrouded impeller 30 causes the liquid metal to flow to furnace 10.

Figure 7:
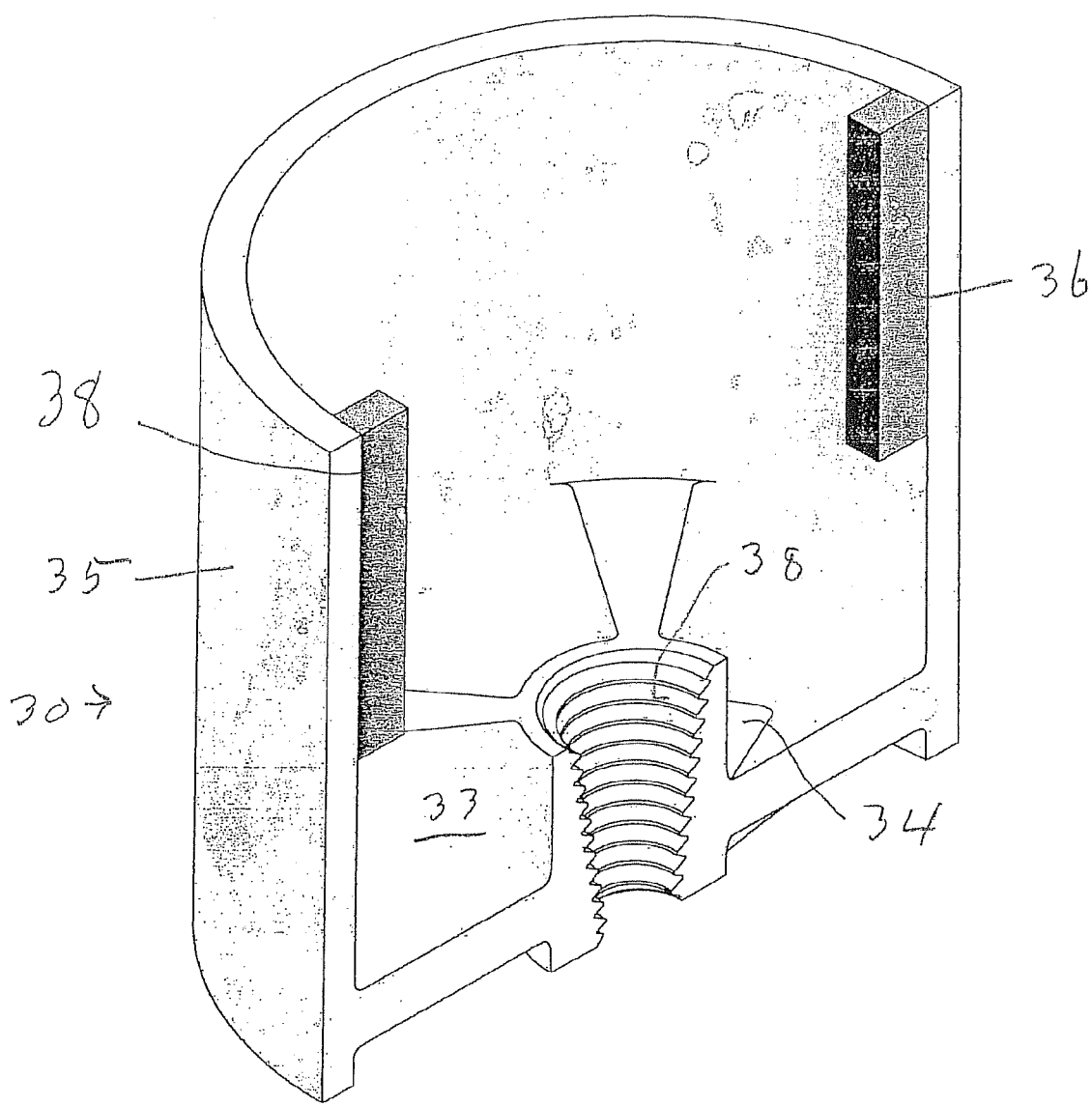
FIG. 7 is a perspective view of a shrouded impeller that can be used in some embodiments of the present invention, cut on a median plane passing through baffles on the shroud.
Figure 8:
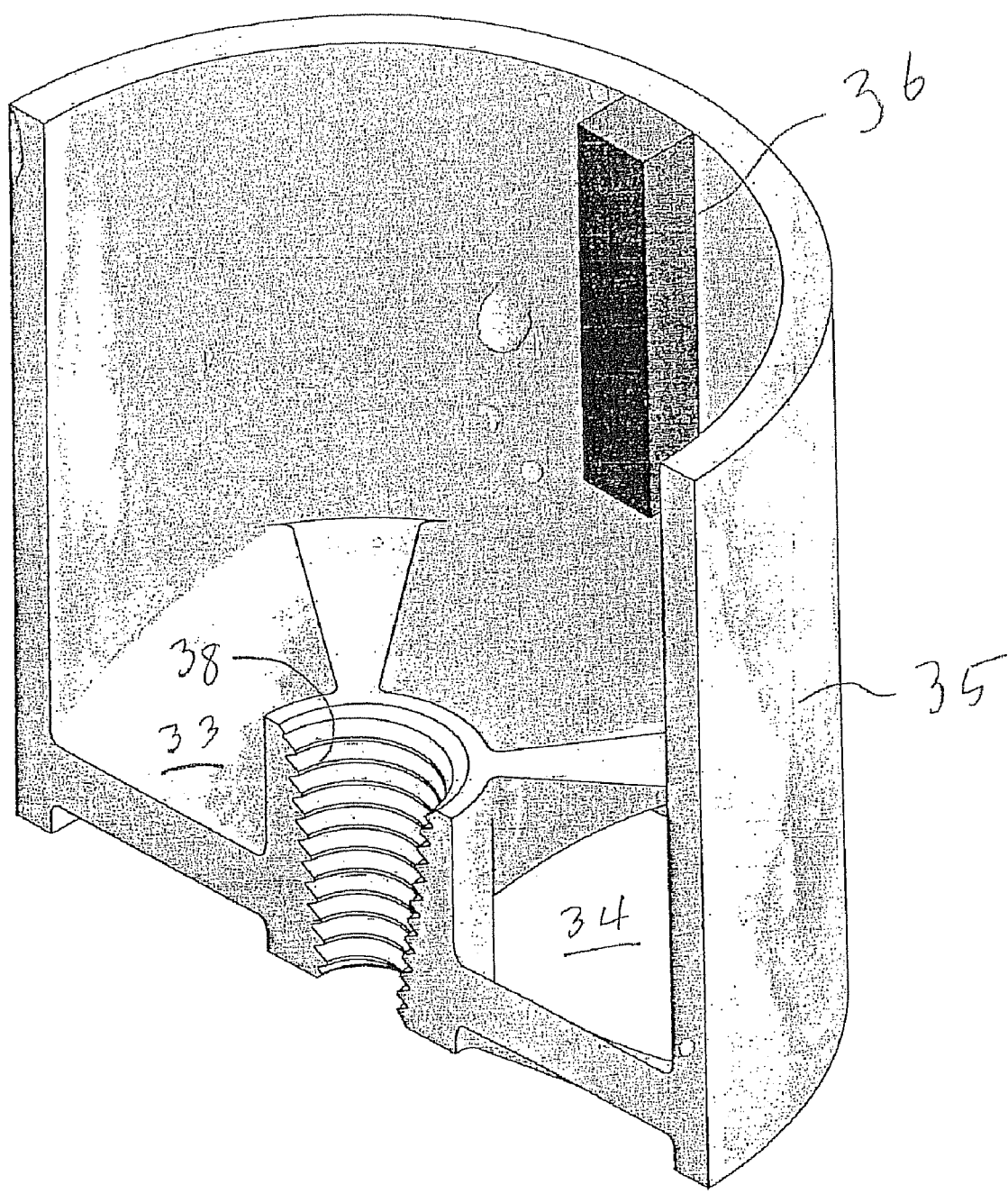
FIG. 8 is a perspective view of the shrouded impeller shown in FIG. 7, cut on a median plane at 90 degrees to the plane of FIG. 7.

FIGS. 7-11 provide details of the shrouded impeller 30. FIG. 7 is a perspective illustration of a shrouded impeller 30 cut along a median plane which passes through the baffles 36 that are an inner surface of shroud 35. FIG. 8 is a similar illustration cut on a plane at 90 degrees relative to the cut of FIG. 7. The shrouded impeller 30 is held and rotated by a shaft (best seen in FIG. 5) which is attached to shrouded impeller 30 at attachment site 38. It is presently preferred that attachment site 38 comprise a tapered threaded socket.

When shrouded impeller 30 is rotated in one direction (clockwise as seen from above) the vanes 33 exert a downward thrust on liquid metal disposed within shroud 35. The molten is caused to flow out of shrouded impeller 30 through openings 34 disposed between the vanes 33.

Figure 9:
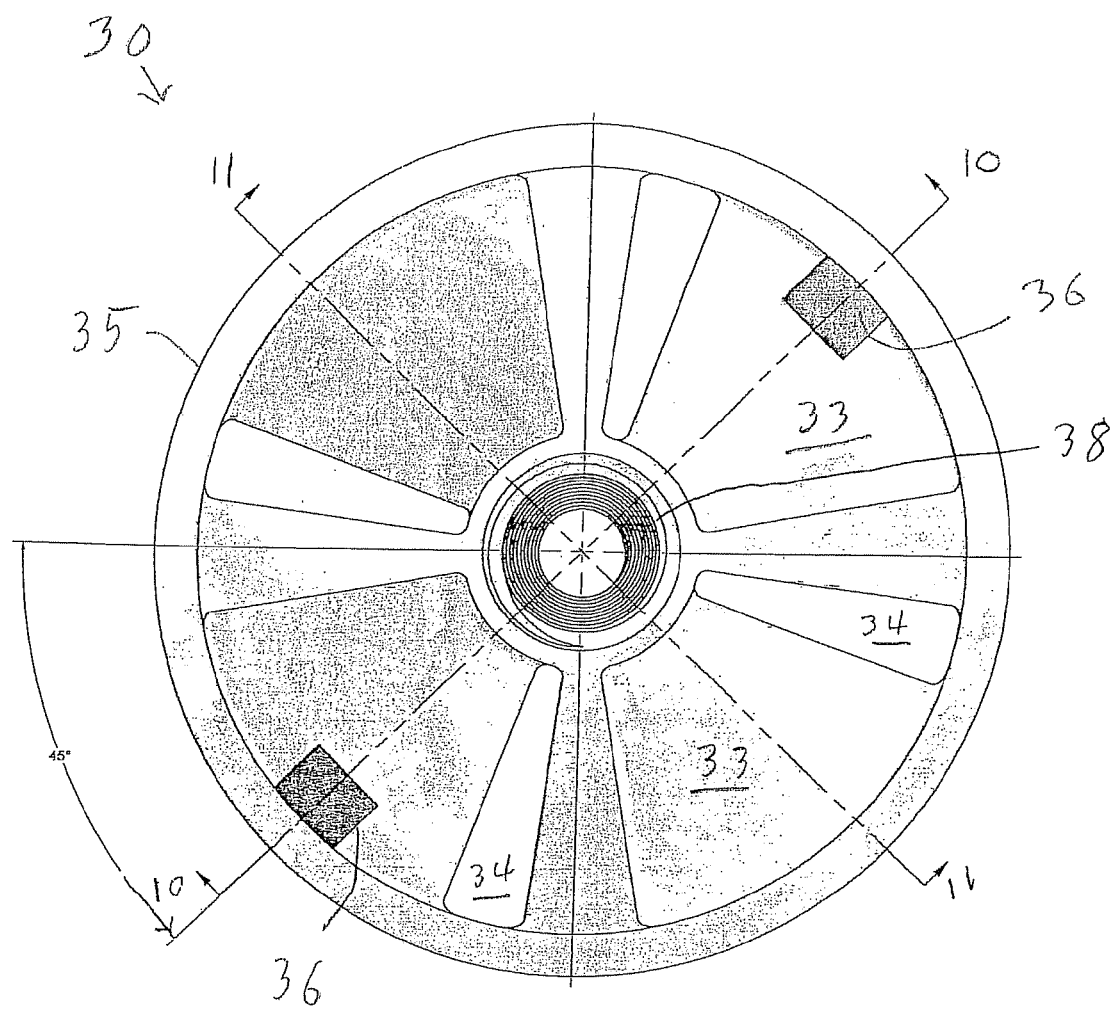
FIG. 9 is a view of the shrouded impeller shown in FIGS. 7 and 8, taken from the open upstream end of the shrouded impeller.
Figure 10:
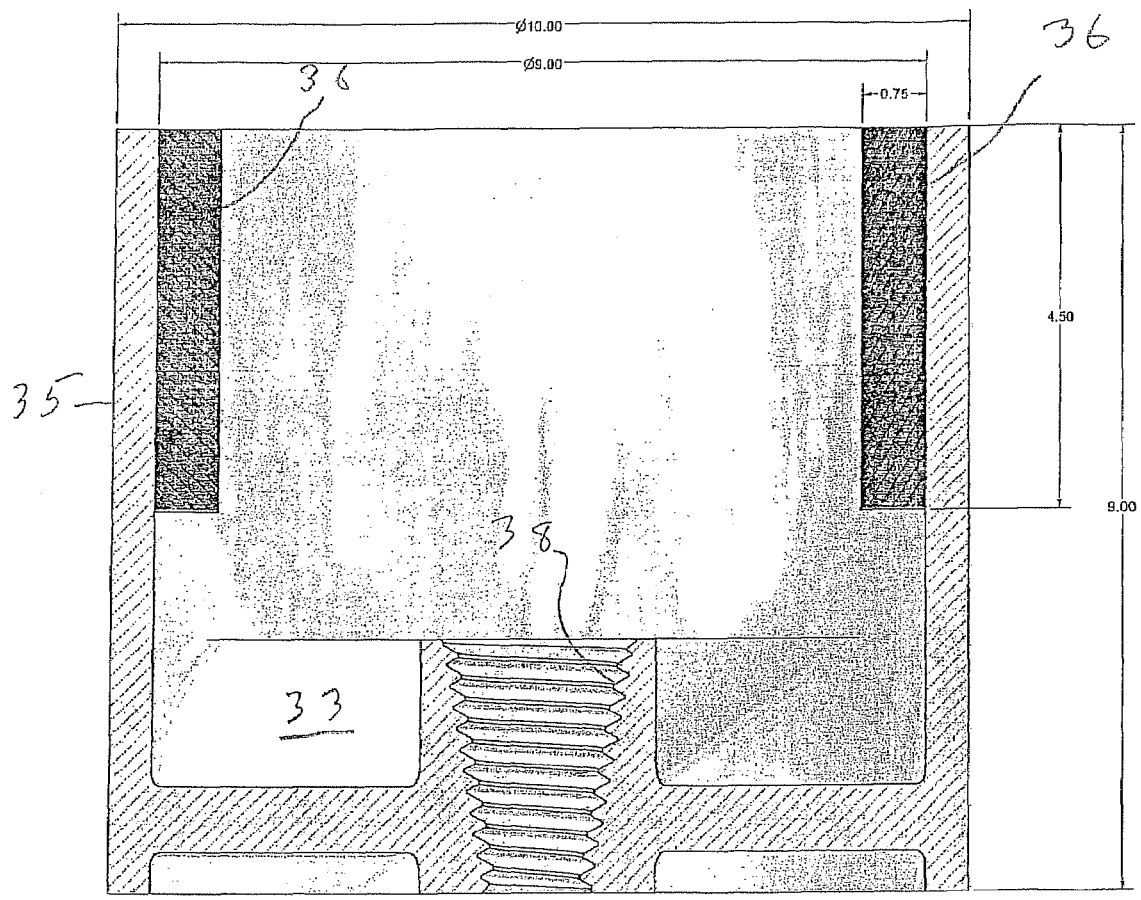
FIG. 10 is section 10-10 defined in FIG. 9.
Figure 11:
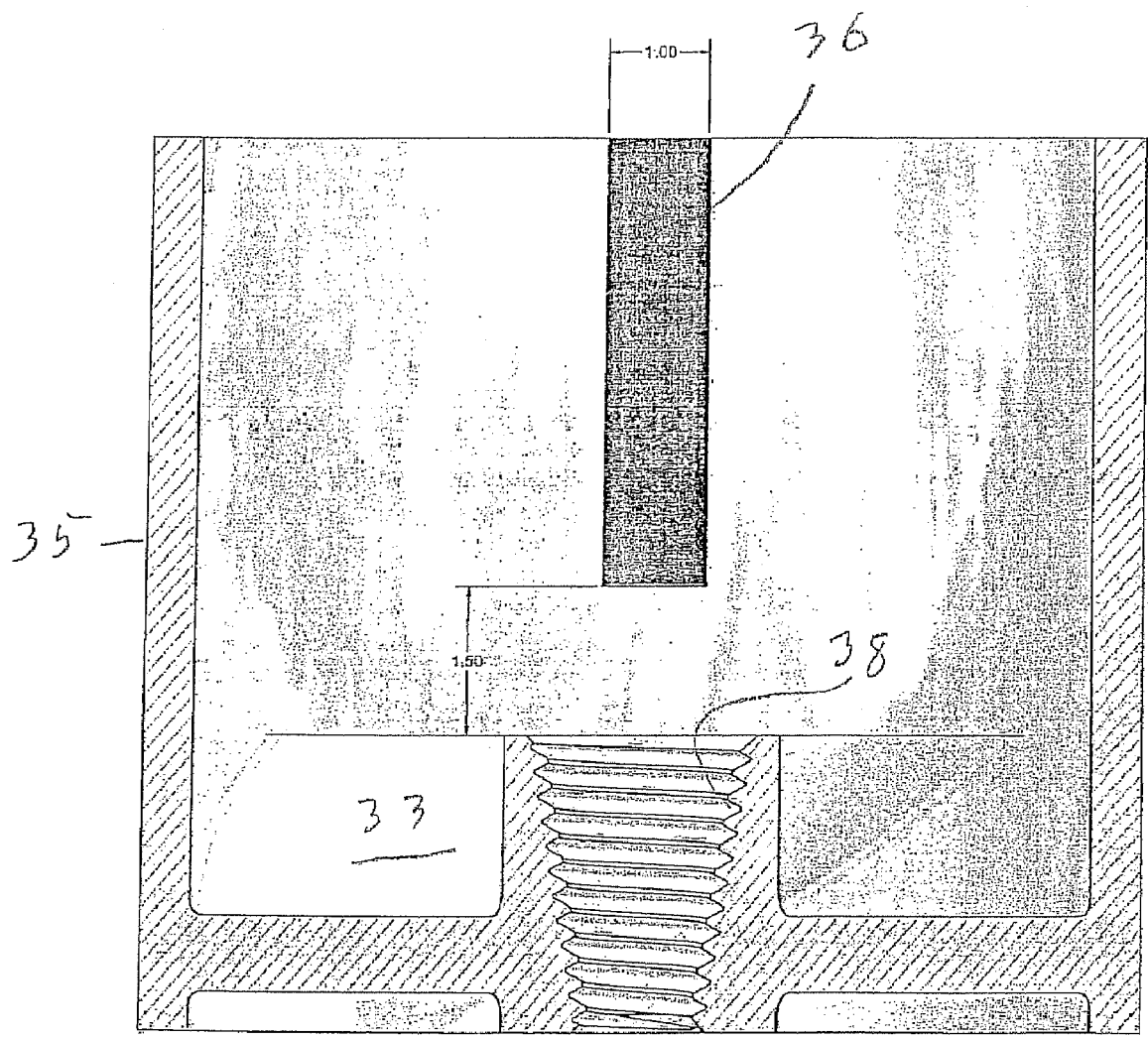
FIG. 11 is section 11-11 defined in FIG. 9.

Openings 34 between vanes 33 can also be seen in FIG. 9, which is a top view of the shrouded impeller 30. FIG. 9 also defines sections 10 and 11, which are illustrated in FIGS. 10 and 11, respectively. The dimensions shown are in inches These are for a presently preferred configuration.

It is noted that the vanes 33 act in the manner of an airplane or boat propeller and cause molten to flow downward, out of shrouded impeller 30 through openings 34. The baffles 36, which are mounted on the inside surface of the rotating shroud, greatly increase the strength of vortex 50 and whirlpool 52.

It has been found that a shrouded impeller having a diameter of 9 inches produces a vortex that is capable of ingesting as much as 10,000 lbs of scrap per hour.

In another embodiment, not shown, an ingester according to the present invention, comprising a shrouded impeller submerged and inclined at an angle relative to the vertical, may be employed in a furnace. The hot environment assists the clean burning of the combustables from the scrap and reduces the emission from the remelting scrap.

Although the present invention has been described in considerable detail with reference to certain preferred versions thereof, other versions are possible. For example, the shrouded impeller can be placed in a different location than that shown in the open charge bay or in another location in the circuit. Therefore, the spirit and scope of the appended claims should not be limited to the description of the preferred versions contained herein.

All features disclosed in the specification, including the claims, abstract, and drawings may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. §112.

We claim:

1. A scrap melter comprising:
   a heating section, a charge bay, and a skim bay in fluid communication to form a molten metal circuit;
   a shaft operably connected to a rotary power at one end of shaft and operably connected to a shrouded impeller at the other end of the shaft,
   wherein the shrouded impeller is immersed in a molten metal pool in the charge bay at an inclined angle relative to vertical such that the shrouded impeller produces a vortex and a whirlpool in the molten metal pool directly above the shrouded impeller and an axial thrust to cause molten metal to flow around the molten metal circuit, and
   wherein a center of the whirlpool being horizontally displaced from at least a portion of the shaft; and
   thus allowing free charging of the scrap whereby the scrap is ingested into the vortex and liquefies into molten metal above the shrouded impeller.

2. The scrap melter, according to claim 1, wherein the heating section comprises a molten metal furnace.

3. The scrap melter according to claim 1, wherein a shroud portion of the shrouded impeller is attached to an impeller portion of the shrouded impeller.

4. The scrap melter according to claim 3, wherein the shroud portion is substantially configured as a cylindrical draft tube, and wherein the cylindrical draft tube is principally disposed upstream of the impeller portion of the shrouded impeller.

5. The scrap melter according to claim 4, wherein an axial dimension of said draft tube exceeds a radius of the draft tube.

6. The scrap melter according to claim 4, further comprising at least one baffle on an inside surface of the draft tube, upstream of the impeller portion of the shrouded impeller.

7. The scrap melter according to claim 6, wherein at least one of the at least one baffle is disposed adjacent an inlet end of the draft tube.

8. The scrap melter according to claim 1, wherein a diameter of the whirlpool is about equal to a diameter of the draft tube.

9. The scrap melter according to claim 1, wherein a principal portion of a surface of the molten metal pool in the charge bay, surrounding the whirlpool, is generally quiescent.

10. The scrap melter according to claim 1, wherein a passage between the charge bay and said skim bay is a submerged passage, and the shrouded impeller is adjacent an inlet of the submerged passage to propel molten metal through the submerged passage into the skim bay.

11. A scrap melter for light gauge metal scrap, scrap melter comprising;
    a shrouded impeller connected to a shaft, the shaft connected to a rotary power device;
    the shrouded impeller immersed in a molten metal pool in a furnace and the shaft is inclined at an angle relative to vertical so that the shrouded impeller produces a vortex in the molten metal pool in said furnace and an axial thrust to cause molten metal to flow around the scrap melter, the vortex producing a whirlpool at a surface of the molten metal pool in the furnace, a center of the whirlpool being horizontally displaced from a portion of the shaft, wherein the vortex and the whirlpool are substantially vertical aligned with the shrouded impeller; and
    thus allowing free charging of the scrap whereby the scrap is ingested into the vortex.

12. The scrap melter according to claim 11, wherein a shroud portion of the shrouded impeller is attached to an impeller portion of the shrouded impeller.

13. The scrap melter according to claim 12, wherein the shroud portion is substantially configured as a cylindrical draft tube, and wherein the cylindrical draft tube is principally disposed upstream of the impeller portion of the shrouded impeller.

14. The scrap melter according to claim 13, further comprising at least one baffle on an inside surface of the draft tube, upstream of the impeller portion of the shrouded impeller.

15. The scrap melter according to claim 14, wherein at least one of the at least one baffle is disposed adjacent an inlet end of the draft tube.

16. The scrap melter according to claim 11, wherein the shrouded impeller contributes to circulation of molten metal in said furnace.

17. A scrap metal melter comprising:
    a molten metal pool;
    a shrouded impeller immersed in the molten metal pool;
    a shaft operably connected to the shrouded impeller, the shaft being inclined at an angle relative to the vertical; and
    a rotary power device operably connected to the shaft;
    wherein the shrouded impeller produces a vortex in the molten metal pool and an axial thrust to cause molten metal to flow around the scrap melter, the vortex produces a whirlpool, and the whirlpool is horizontally displaced from a portion of the shaft,
    wherein the vortex and the whirlpool are vertically aligned with the shrouded impeller.

* * * * *